(12) United States Patent
Nagendran et al.

(10) Patent No.: US 11,503,537 B2
(45) Date of Patent: Nov. 15, 2022

(54) TRIGGER-CLIENT BASED CLIENT STEERING IN MESH NETWORKS

(71) Applicant: QUALCOMM Incorporated, San Diego, CA (US)

(72) Inventors: Thanigaivel Nagendran, Chennai (IN); Vignesh Elumalai, Chennai (IN); Subramanian Anantharaman, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/109,755

(22) Filed: Dec. 2, 2020

(65) Prior Publication Data

US 2022/0174527 A1   Jun. 2, 2022

(51) Int. Cl.
*H04W 16/22* (2009.01)
*H04W 16/28* (2009.01)
(Continued)

(52) U.S. Cl.
CPC ........... *H04W 48/20* (2013.01); *H04W 16/22* (2013.01); *H04W 16/28* (2013.01); *H04W 24/08* (2013.01); *H04W 24/10* (2013.01); *H04W 28/0804* (2020.05); *H04W 28/0827* (2020.05); *H04W 36/0009* (2018.08); *H04W 36/0058* (2018.08); *H04W 36/08* (2013.01); *H04W 36/22* (2013.01); *H04W 48/16* (2013.01); *H04W 84/02* (2013.01); *H04W 84/18* (2013.01); *H04W 88/02* (2013.01);
(Continued)

(58) Field of Classification Search
CPC ... H04B 7/02–12; H04B 17/0082–3913; H04J 11/0023–0093; H04J 2011/0003–0096; H04L 5/0001–0098; H04W 4/30–33; H04W 8/22–245; H04W 16/18–28; H04W 24/02–10; H04W 28/02–26; H04W 36/0005–385; H04W 48/02–20; H04W 60/005–06; H04W 72/005–14; H04W 74/002–0891; H04W 76/10–50; H04W 84/005–22; H04W 88/005–188; H04W 92/02–24
See application file for complete search history.

(56) References Cited

U.S. PATENT DOCUMENTS

| | | | |
|---|---|---|---|
| 2010/0003980 A1* | 1/2010 | Rune | H04W 48/16 |
| 2018/0020383 A1* | 1/2018 | Sirotkin | H04W 48/18 |
| 2018/0352493 A1 | 12/2018 | Strater et al. | |

OTHER PUBLICATIONS

International Search Report and Written Opinion—PCT/US2021/057421—ISA/EPO—dated Feb. 28, 2022.

\* cited by examiner

*Primary Examiner* — Timothy J Weidner
(74) *Attorney, Agent, or Firm* — Holland & Hart LLP

(57) ABSTRACT

Methods, systems, and devices for steering in mesh networks by a serving device are described. The method may include determining that a client device within a range of the serving device is eligible for steering, where the client device is outside a set of one or more trigger client devices, requesting, based on the determination, a radio resource management report from at least one trigger client device of the set of one or more trigger client devices, receiving the radio resource management report from the at least one trigger client device of the set of one or more trigger client devices, and performing a steering operation of the client device from the serving device to a target device based on the radio resource management report from the at least one trigger client device.

18 Claims, 11 Drawing Sheets

(51) Int. Cl.
*H04W 24/08* (2009.01)
*H04W 24/10* (2009.01)
*H04W 28/08* (2009.01)
*H04W 36/00* (2009.01)
*H04W 36/08* (2009.01)
*H04W 36/22* (2009.01)
*H04W 48/16* (2009.01)
*H04W 48/20* (2009.01)
*H04W 84/02* (2009.01)
*H04W 84/18* (2009.01)
*H04W 88/02* (2009.01)
*H04W 88/08* (2009.01)
*H04W 92/02* (2009.01)
*H04W 92/10* (2009.01)

(52) U.S. Cl.
CPC ............ *H04W 88/08* (2013.01); *H04W 92/02* (2013.01); *H04W 92/10* (2013.01)

TRIGGER-CLIENT BASED CLIENT STEERING IN MESH NETWORKS

BACKGROUND

The following relates to steering in mesh networks by a serving device, including trigger-client based client steering in mesh networks.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via DL and UL. The DL (or forward link) may refer to the communication link from the AP to the station, and the UL (or reverse link) may refer to the communication link from the station to the AP.

Some steering algorithms give all clients the same priority, resulting in all the clients in the network being given equal opportunity for steering. However, giving all the clients the same priority may result in a delay in steering responsive clients or compliant clients (e.g., clients compliant to a wireless protocol) since non-responsive and non-compliant clients are given the same priority as responsive clients and compliant clients. Wireless systems and devices may benefit from improved techniques in steering algorithms.

SUMMARY

The described techniques relate to improved methods, systems, devices, and apparatuses that support trigger-client based client steering in mesh networks. Generally, the described techniques provide for a serving device determining that a client device within a range of the serving device is eligible for steering and requesting, based on the determination, a radio resource measurement report from at least one trigger client device of the one or more trigger client devices. In some cases, the described techniques provide for the serving device receiving the radio resource management report from the at least one trigger client device of the one or more trigger client devices and performing a steering operation of the client device from the serving device to a target device based on the radio resource management report from the at least one trigger client device. In some cases, the client device may not be part of a set of one or more trigger client devices. In some cases, the client device may be a non-responding client device. In some cases, the client device may be a trigger client device of the one or more trigger client devices.

A method of steering in mesh networks by a serving device, the method including is described. The method may include determining that a client device within a range of the serving device is eligible for steering, where the client device is outside a set of one or more trigger client devices, requesting, based on the determination, a radio resource management report from at least one trigger client device of the set of one or more trigger client devices, receiving the radio resource management report from the at least one trigger client device of the set of one or more trigger client devices, and performing a steering operation of the client device from the serving device to a target device based on the radio resource management report from the at least one trigger client device.

An apparatus for steering in mesh networks by a serving device, the method including is described. The apparatus may include a processor, memory coupled with the processor, and instructions stored in the memory. The instructions may be executable by the processor to cause the apparatus to determine that a client device within a range of the serving device is eligible for steering, where the client device is outside a set of one or more trigger client devices, request, based on the determination, a radio resource management report from at least one trigger client device of the set of one or more trigger client devices, receive the radio resource management report from the at least one trigger client device of the set of one or more trigger client devices, and perform a steering operation of the client device from the serving device to a target device based on the radio resource management report from the at least one trigger client device.

Another apparatus for steering in mesh networks by a serving device, the method including is described. The apparatus may include means for determining that a client device within a range of the serving device is eligible for steering, where the client device is outside a set of one or more trigger client devices, requesting, based on the determination, a radio resource management report from at least one trigger client device of the set of one or more trigger client devices, receiving the radio resource management report from the at least one trigger client device of the set of one or more trigger client devices, and performing a steering operation of the client device from the serving device to a target device based on the radio resource management report from the at least one trigger client device.

A non-transitory computer-readable medium storing code for steering in mesh networks by a serving device, the method including is described. The code may include instructions executable by a processor to determine that a client device within a range of the serving device is eligible for steering, where the client device is outside a set of one or more trigger client devices, request, based on the determination, a radio resource management report from at least one trigger client device of the set of one or more trigger client devices, receive the radio resource management report from the at least one trigger client device of the set of one or more trigger client devices, and perform a steering operation of the client device from the serving device to a target device based on the radio resource management report from the at least one trigger client device.

In some examples of the method, apparatuses, and non-transitory computer-readable medium described herein, performing the steering operation may include operations, features, means, or instructions for comparing a received channel power indicator of the serving device indicated in the radio resource management report to a received channel power indicator of the target device indicated in the radio resource management report, and determining the received channel power indicator of the target device exceeds the received channel power indicator of the serving device.

Some examples of the method, apparatuses, and non-transitory computer-readable medium described herein may further include operations, features, means, or instructions for determining that the client device complies with a wireless protocol, and requesting, from the client device, a second radio resource management report based on determining that the client device complies with the wireless protocol.

Some examples of the method, apparatuses, and non-transitory computer-readable medium described herein may further include operations, features, means, or instructions for receiving the radio resource management report from the client device, and steering the client device from a network of the serving device to a network of the target device based on the radio resource management report from the client device.

Some examples of the method, apparatuses, and non-transitory computer-readable medium described herein may further include operations, features, means, or instructions for designating, based on receiving the radio resource management report from the client device, a higher steering priority on the client device than on one or more other client devices in the network of the serving device.

Some examples of the method, apparatuses, and non-transitory computer-readable medium described herein may further include operations, features, means, or instructions for determining the requested radio resource management report may be not received from the client device, and estimating a received channel power indicator for the client device based on the received channel power indicator of the serving device or the received channel power indicator of the target device, or both, indicated in the radio resource management report of the at least one trigger client device.

In some examples of the method, apparatuses, and non-transitory computer-readable medium described herein, the wireless protocol includes an 802.11k wireless protocol.

In some examples of the method, apparatuses, and non-transitory computer-readable medium described herein, at least one aspect of the radio resource management report may be based on the 802.11k wireless protocol.

In some examples of the method, apparatuses, and non-transitory computer-readable medium described herein, determining the client device may be eligible for steering may include operations, features, means, or instructions for determining a received signal strength indicator of the client device satisfies a signal strength threshold.

Some examples of the method, apparatuses, and non-transitory computer-readable medium described herein may further include operations, features, means, or instructions for determining a second client device may be not eligible for steering, monitoring the second client device for steering eligibility, and identifying a trigger client device based on the monitoring and a user request or historical steering success rates, or both.

Some examples of the method, apparatuses, and non-transitory computer-readable medium described herein may further include operations, features, means, or instructions for passing one or more parameters of a network of the serving device or one or more parameters of a network of the target device, or both, through a decision tree model, and identifying, based on an output of the decision tree model, a trigger client device of the network of the serving device or the network of the target device.

In some examples of the method, apparatuses, and non-transitory computer-readable medium described herein, the serving device may be a serving access point and the target device may be a target access point.

DETAILED DESCRIPTION

Figure 1:
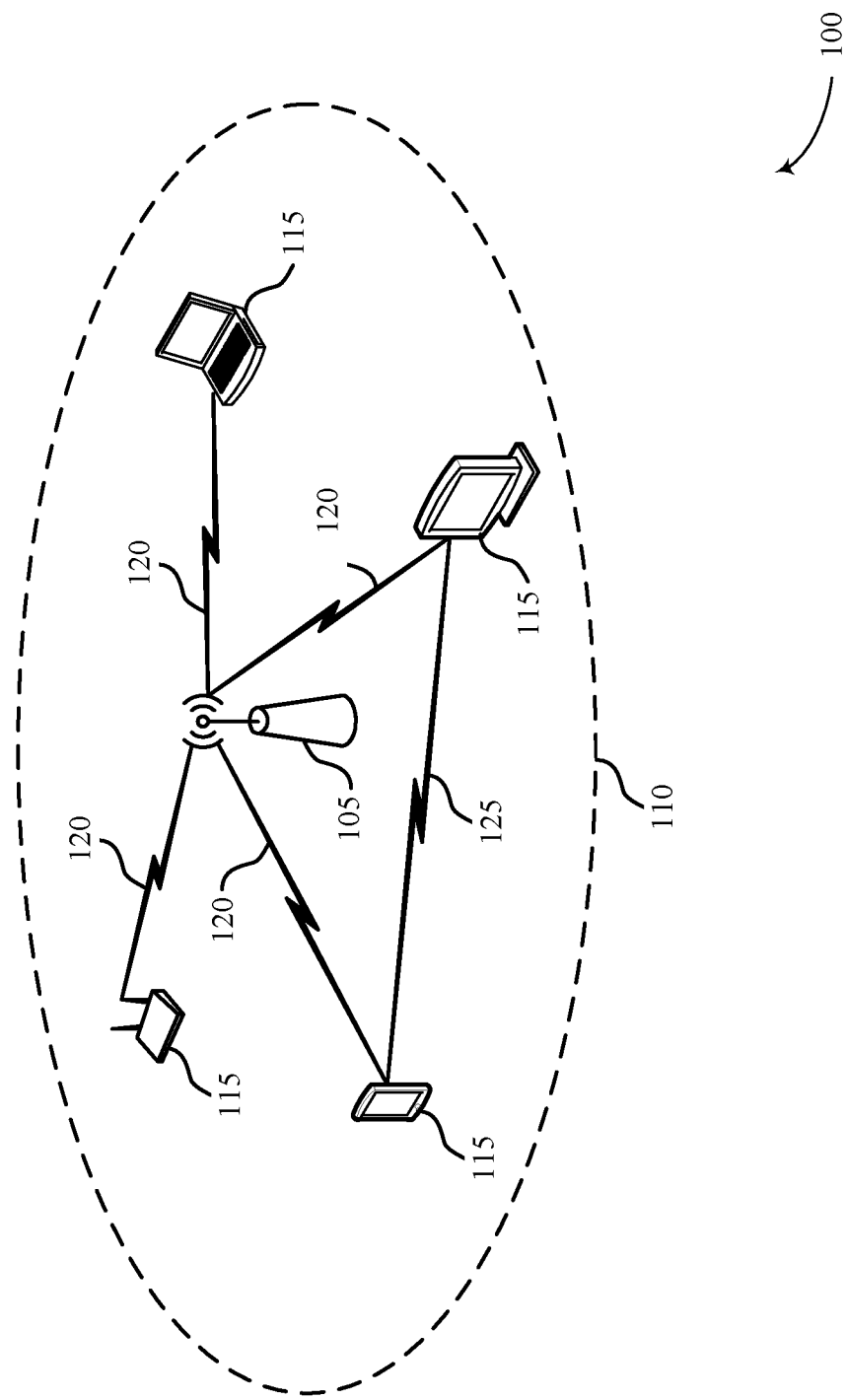
FIG. 1 illustrates an example of a system for steering in mesh networks by a serving device that supports trigger-client based client steering in mesh networks in accordance with aspects of the present disclosure.

The present techniques include steering clients in mesh networks. The present techniques provide improvements to operations associated with trigger client device based client steering in mesh networks. Steering is a method by which clients connected to a mesh node are seamlessly handed off to other nodes in the mesh network without changes in Layer-7 connectivity. Steering provides balance to network loads and carrier and user demands, data offloading, interference management, and energy saving policies.

Some steering algorithms may be based on a wireless protocol (e.g., Institute of Electrical and Electronics Engineers (IEEE) 802.11, 802.11k, etc.). In some cases, a steering algorithm may be based on radio resource management (RRM) measurement reports for performing steering of client devices. In some cases, the RRM measurement reports may be based on a wireless protocol (e.g., based on the 802.11k wireless protocol). However, mesh networks may include both responsive client devices and non-responsive client devices. In some cases, a responsive client device may be determined (e.g., by an access point or another client device) to be compliant with a wireless protocol (e.g., 802.11k wireless protocol), or determined to be responsive to requests for RRM measurement reports, or both. In some cases, a non-responsive client device may be determined to be non-compliant with the wireless protocol or determined to be non-responsive to requests for RRM measurement reports, or both. Thus, some methods of steering based on RRM measurement reports may not extend to all devices on the network (e.g., non-compliant client devices, non-responsive client devices, compliant client devices that do not respond within an allotted time period, etc.). Because some client devices may not respond to requests for a RRM measurement report when requested (e.g., due to a request time out, due to non-compliance, etc.), current steering methods may leave some client devices underserved, resulting in imbalances in network loads and carrier and user demands, data offloading, interference management, and energy saving policies.

The present techniques provide improvements to current steering mechanisms by enabling at least one client device in a mesh network to be configured as a trigger client device for non-responsive client devices. The trigger client device may be configured to provide a measurement report for one or more non-responsive client devices to enable the associated non-responsive client devices to participate in steering based on RRM measurement reports. In some cases, a trigger client device may be a client device that is determined (e.g., by an access point or other client device) to be compliant with a wireless protocol (e.g., 802.11k wireless protocol) and responsive to report requests that are based on the wireless protocol (e.g., RRM measurement report requests). In some cases, a trigger client device may include a client device that is determined (e.g., by an access point or other client device) to be stationary or relatively stationary within a given network.

Aspects of the disclosure are initially described in the context of a wireless communications system. Aspects of the disclosure are further illustrated by and described with reference to block diagrams and flowcharts that relate to trigger-client based client steering in mesh networks. Aspects of the disclosure are further illustrated by and described with reference to apparatus diagrams, system diagrams, and flowcharts that relate to trigger-client based client steering in mesh networks.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a BSS or an ESS. The various STAs 115 in the network are able to communicate with one another through the AP 105. Also shown is a coverage area 110 of the AP 105, which may represent a BSA of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, 802.11k, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

Aspects of the subject matter described herein may be implemented to realize one or more advantages. The described techniques may support improvements in system efficiency such that a wireless device (e.g., STA, a wireless device that is stationary or relatively stationary within a network, etc.) may be defined as a trigger client device. In some cases, a trigger client device may be compliant with a wireless protocol (e.g., 802.11k wireless protocol). In some cases, some wireless devices in a network may not be compliant with the wireless protocol.

In some examples, multiple wireless devices may be defined as a set of trigger client devices. In some cases, the set of trigger client devices may be updated periodically. In some cases, an access point may use the set of trigger client devices (e.g., information from the set of trigger client devices) for making steering decisions of other wireless devices (e.g., client devices other than the set of trigger client devices). In some cases, the present techniques may enable an access point (e.g., AP 105) to steer some wireless devices (e.g., non-responsive client devices, less-responsive client devices, non-compliant client devices) as effectively as responsive wireless devices and compliant wireless devices. Accordingly, the present techniques improve the distribution of workload and bandwidth over multiple networks (e.g., multiple APs), resulting in an increased user-experience.

Figure 2:
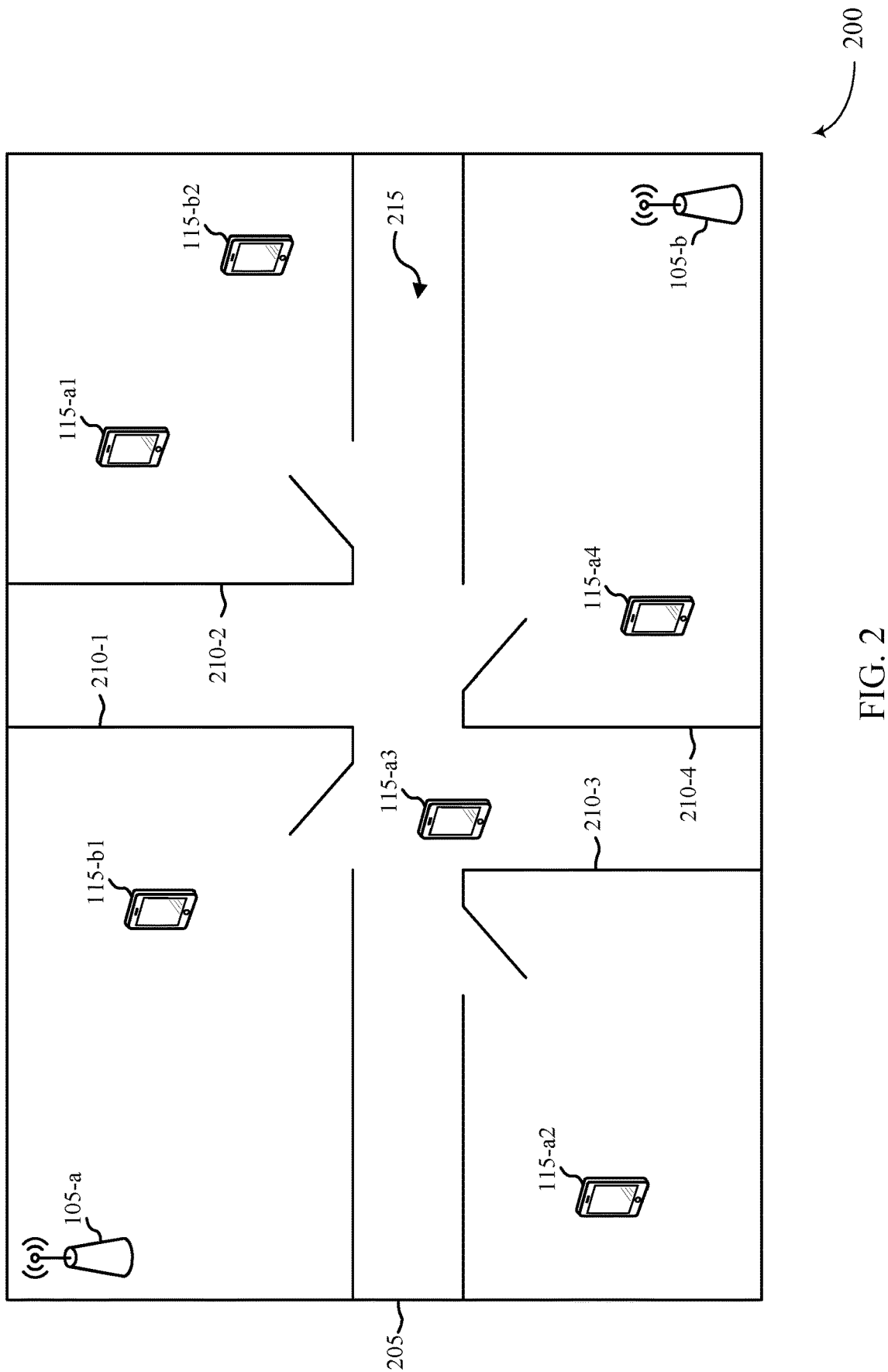
FIG. 2 illustrates a block diagram of one example of an environment that supports trigger-client based client steering in mesh networks in accordance with various aspects of the present disclosure.

FIG. 2 illustrates an example of an environment 200 that supports trigger-client based client steering in mesh networks in accordance with aspects of the present disclosure. In some examples, environment 200 may implement aspects of WLAN 100.

In the illustrated example, environment 200 may include premises 205. Examples of premises 205 may include a home, an office, a place of business, a school, or any other type of building. As depicted, premises 205 may include one or more rooms. For example, premises 205 may include rooms 210-1, 210-2, 210-3, and 210-4, as well as a central area 215 (e.g., a hallway, an entry way, a reception area, etc.). As shown, room 210-1 may include access point (AP) 105-*a* and room 210-4 may include AP 105-*b*.

As depicted, premises 205 may include one or more stations (STAs) or wireless communication devices. In some cases, the depicted one or more STAs may include one or more responsive STAs that are compliant with a wireless protocol (e.g., a 802.11k wireless protocol) or that are responsive to a report request based on the wireless protocol, or both. In the illustrated example, the responsive STAs may include STA 115-a1, STA 115-a2, STA 115-a3, STA 115-a4, etc. In some cases, the responsive STAs may include one or more trigger client devices, where a trigger client device is determined (e.g., by AP 105-a or AP 105-b) to be compliant with the wireless protocol and responsive to report requests based on the wireless protocol. In some cases, a trigger client device may include client devices that AP 105-a or AP 105-b determines are stationary or relatively stationary.

In some cases, the depicted one or more STAs may include one or more non-responsive STAs that are not compliant with the wireless protocol, or that are not responsive to a report request based on the wireless protocol, or that are inconsistently responsive to a report request based on the wireless protocol, or that are temporarily unresponsive to a report request based on the wireless protocol, or any combination thereof. In the illustrated example, the non-responsive STAs may include STA 115-b1 and STA 115-b2, etc. In some cases, one or more non-responsive STAs may be compliant with the wireless protocol, but because they do not respond to a report request based on the wireless protocol they may be determined to be non-responsive STAs.

In some cases, AP 105-a or AP 105-b may determine that a non-responsive STA is eligible for steering based on a received signal strength indicator of the non-responsive STA satisfying a signal strength threshold. When AP 105-a or AP 105-b determines that a client device is a responsive STA (e.g., the STA is compliant with a wireless protocol), but the responsive STA is not a trigger client device, then AP 105-a or AP 105-b may initiate a report request (e.g., radio resource management measurement report) and transmit the request to that responsive STA. In some cases, AP 105-a or AP 105-b may transmit the request to the responsive STA and to each trigger client device in the respective network (e.g., the network of AP 105-a or AP 105-b). When the responsive STA responds by transmitting a report to AP 105-a or AP 105-b, then AP 105-a or AP 105-b may give this responsive STA a higher priority than one or more non-responsive STAs. In some cases, when AP 105-a or AP 105-b receives the report from the responsive STA, then AP 105-a or AP 105-b may proceed with the steering operation for the responsive STA based on the information in the report (e.g., received channel power indicator (RCPI) information with respect to AP 105-a and RCPI information with respect to AP 105-b).

In some cases, when AP 105-a or AP 105-b does not receive the report from the responsive STA (e.g., the responsive STA becomes a non-responsive STA when the request times out, when AP 105-a or AP 105-b does not receive the report within a given time period), then AP 105-a or AP 105-b may estimate an approximate RCPI value for this responsive STA (e.g., a previously responsive STA, a STA that is still compliant with the wireless protocol, etc.) based on the reports that AP 105-a or AP 105-b receives from the one or more trigger client devices that receive and respond to the transmitted request.

In some cases, a non-responsive STA may not respond to report requests because the non-responsive STA does not comply with a given wireless protocol (e.g., 802.11k wireless protocol). When AP 105-a or AP 105-b determines the non-responsive STA is not a compliant STA, then AP 105-a or AP 105-b may initiate a report request (e.g., generate a radio resource management measurement report request) and transmit the request to each trigger client device in the respective network. In some cases, AP 105-a or AP 105-b may estimate an approximate RCPI value for the non-compliant STA with respect to AP 105-a or AP 105-b based on the reports that AP 105-a or AP 105-b receives from the one or more trigger client devices that receive and respond to the transmitted request. In some cases, the more trigger client devices that respond to the transmitted request by transmitting a report to AP 105-a or AP 105-b the more accurate the estimated RCPI value for the non-compliant STA. In some examples, the AP 105-a may steer the non-compliant STA to AP 105-b (or AP 105-b to AP 105-a) based on the estimated RCPI value for the non-compliant STA.

In some examples, AP 105-a may be a serving AP for STA 115-a2, STA 115-b 1, and STA 115-a3. In some cases, AP 105-a may determine that STA 115-a2 and STA 115-a3 are responsive STAs, and that STA 115-b1 is a non-responsive STA. In some cases, AP 105-a may determine that STA 115-a2 or STA 115-a3, or both, are within the set of one or more trigger client devices and that STA 115-b1 is outside the set of one or more trigger client devices.

In some examples, AP 105-a may determine that STA 115-b1 is eligible for steering. In some examples, STA 115-b1 may be moving away from AP 105-a and closer to AP 105-b, upon which AP 105-a may determine that STA 115-b1 is eligible for steering. In some cases, AP 105-a may determine that STA 115-b1 is eligible for steering based on a received signal strength indicator of STA 115-b1 satisfying a signal strength threshold.

In some cases, AP 105-a may determine that STA 115-b1 is a non-responsive STA (e.g., that STA 115-b1 is outside the set of one or more trigger client devices). In some examples, based on determining that STA 115-b1 is a non-responsive STA, AP 105-a may request a radio resource management report from at least STA 115-a2 or STA 115-a3, or at least both (e.g., from at least one trigger client device of the set of one or more trigger client devices). In some examples, AP 105-a may request a radio resource management report from at least STA 115-a1 or STA 115-a4, or at least both.

In some examples, AP 105-a may receive the radio resource management report from at least STA 115-a2 or STA 115-a3, or at least both. Additionally, or alternatively, AP 105-a may receive the radio resource management report from at least STA 115-a1 or STA 115-a4, or at least both. In some examples, AP 105-a may perform a steering operation of STA 115-b1 from AP 105-a to AP 105-b based at least in part on the radio resource management report from at least STA 115-a2 or STA 115-a3, or at least both (e.g., from at least one trigger client device).

In some examples, AP 105-b may be a serving AP for STA 115-a1, STA 115-b2, and STA 115-a4. In some cases, AP 105-a may determine that STA 115-a1 and STA 115-a4 are responsive STAs, and that STA 115-b2 is a non-responsive STA. In some cases, AP 105-b may determine that STA 115-a1 or STA 115-a4, or both, are within the set of one or more trigger client devices and that STA 115-b2 is outside the set of one or more trigger client devices.

In some examples, AP 105-b may determine that STA 115-b2 is eligible for steering. In some examples, STA 115-b2 may be moving away from AP 105-b and closer to AP 105-a, upon which AP 105-b may determine that STA 115-b2 is eligible for steering. In some cases, AP 105-b may determine that STA 115-b2 is eligible for steering based on a received signal strength indicator of STA 115-b2 satisfying a signal strength threshold.

In some cases, AP 105-b may determine that STA 115-b2 is a non-responsive STA (e.g., that STA 115-b2 is outside the set of one or more trigger client devices). In some examples, based on determining that STA 115-b2 is a non-responsive STA, AP 105-*b* may request a radio resource management report from at least STA 115-*a*1 or STA 115-*a*4, or at least both (e.g., from at least one trigger client device of the set of one or more trigger client devices). In some examples, AP 105-*b* may request a radio resource management report from at least STA 115-*a*2 or STA 115-*a*3, or at least both.

In some examples, AP 105-*b* may receive the radio resource management report from at least STA 115-*a*1 or STA 115-*a*4, or at least both. In some examples, AP 105-*b* may perform a steering operation of STA 115-*b*2 from AP 105-*b* to AP 105-*a* based at least in part on the radio resource management report from at least STA 115-*a*1 or STA 115-*a*4, or at least both (e.g., from at least one trigger client device).

In some examples, AP 105-*b* may receive the radio resource management report from at least STA 115-*a*2 or STA 115-*a*3, or at least both. In some examples, AP 105-*b* may perform a steering operation of STA 115-*b*2 from AP 105-*b* to AP 105-*a* based at least in part on the radio resource management report from at least STA 115-*a*2 or STA 115-*a*3, or at least both (e.g., from at least one trigger client device).

When a network of AP 105-*a* or AP 105-*b* includes a non-responsive STA (e.g., STA 115-*b*1 or STA 115-*b*2), AP 105-*a* or AP 105-*b* may not receive the RCPI from the non-responsive STA. In some cases, AP 105-*a* or AP 105-*b* may determine (e.g., estimate or predict) the RCPI information of a non-responsive STA based on RCPI information from one or more responsive STAs. Thus, AP 105-*a* or AP 105-*b* may receive RCPI information from one or more responsive STAs (e.g., STA 115-*a*1, STA 115-*a*2, STA 115-*a*3 or STA 115-*a*4) and estimate the RCPI value for the non-responsive STA (e.g., STA 115-*b*1 or STA 115-*b*2) based on the RCPI information from the one or more responsive STAs. The higher the number of responsive STAs (e.g., trigger client devices) providing their RCPI information to AP 105-*a* or AP 105-*b*, the higher the accuracy of the predicted or estimated RCPI value for the non-responsive STA.

In some examples, AP 105-*a* or AP 105-*b* may establish a peer-to-peer connection (e.g., Wi-Fi-Direct connection) between the non-responsive STA (e.g., STA 115-*b*1 or STA 115-*b*2) and a responsive STA (e.g., STA 115-*a*1, STA 115-*a*2, STA 115-*a*3 or STA 115-*a*4). In some cases, AP 105-*a* or AP 105-*b* may establish a peer-to-peer connection to get the RCPI information from the less-responsive or non-compliant client device (e.g., non-11k-compliant client devices). In some cases, AP 105-*a* or AP 105-*b* may establish the peer-to-peer connection when the non-responsive STA becomes eligible for steering. In some cases, the peer-to-peer connection may enable the responsive STA to receive the RCPI value from the non-responsive STA (e.g., when the non-responsive STA becomes eligible for steering).

Some steering algorithm may treat all client devices (e.g., responsive STAs and non-responsive STAs, compliant STAs and non-compliant STAs) the same way, where all the client devices in a network are given equal opportunity for steering. However, giving opportunity for steering equally to all client devices may result in delays in steering compliant and responsive STAs (e.g., trigger client devices). And when equal opportunity is given to non-responsive STAs, the opportunity is often squandered because non-responsive STAs might not respond to requests for information (e.g., requests for RCPI information), resulting in unsuccessful steering.

In some examples, AP 105-*a* or AP 105-*b* may identify responsive STAs (e.g., trigger client devices that are compliant with a wireless protocol such as 802.11k) and characterize the responsive STAs as "preferred" client devices.

In some cases, AP 105-*a* or AP 105-*b* may give higher priority to preferred client devices (e.g., higher priority for steering operations over non-responsive STAs). In some cases, characterizing the responsive STAs as preferred client devices may increase the steering success rate (e.g., the number of successful steering operations over the total number of steering operations initiated). In some cases, characterizing the responsive STAs as preferred client devices may provide higher steering opportunities for steering-responsive client devices, resulting in an improved user experience (e.g., while a client device is roaming, etc.). In some cases, AP 105-*a* or AP 105-*b* may ignore non-responsive STAs (e.g., non-preferred client devices) while AP 105-*a* or AP 105-*b* performs steering operations for the responsive STAs (e.g., preferred client devices).

Aspects of the subject matter described herein may be implemented to realize one or more advantages. The described techniques support improvements in system efficiency such that delays in waiting for requested reports (e.g., requested radio resource management reports) from non-responsive STAs that are determined (e.g., by AP 105-*a* or AP 105-*b*) to be unresponsive to such requests are reduced. Additionally, described techniques result in improved steering operation efficiency, thereby improving user experience. Any trigger client device in a network may be configured to assist in steering non-responsive STAs in the network (e.g., based on forming an inter-dependent mesh network between trigger client devices and non-responsive STAs).

Figure 3:
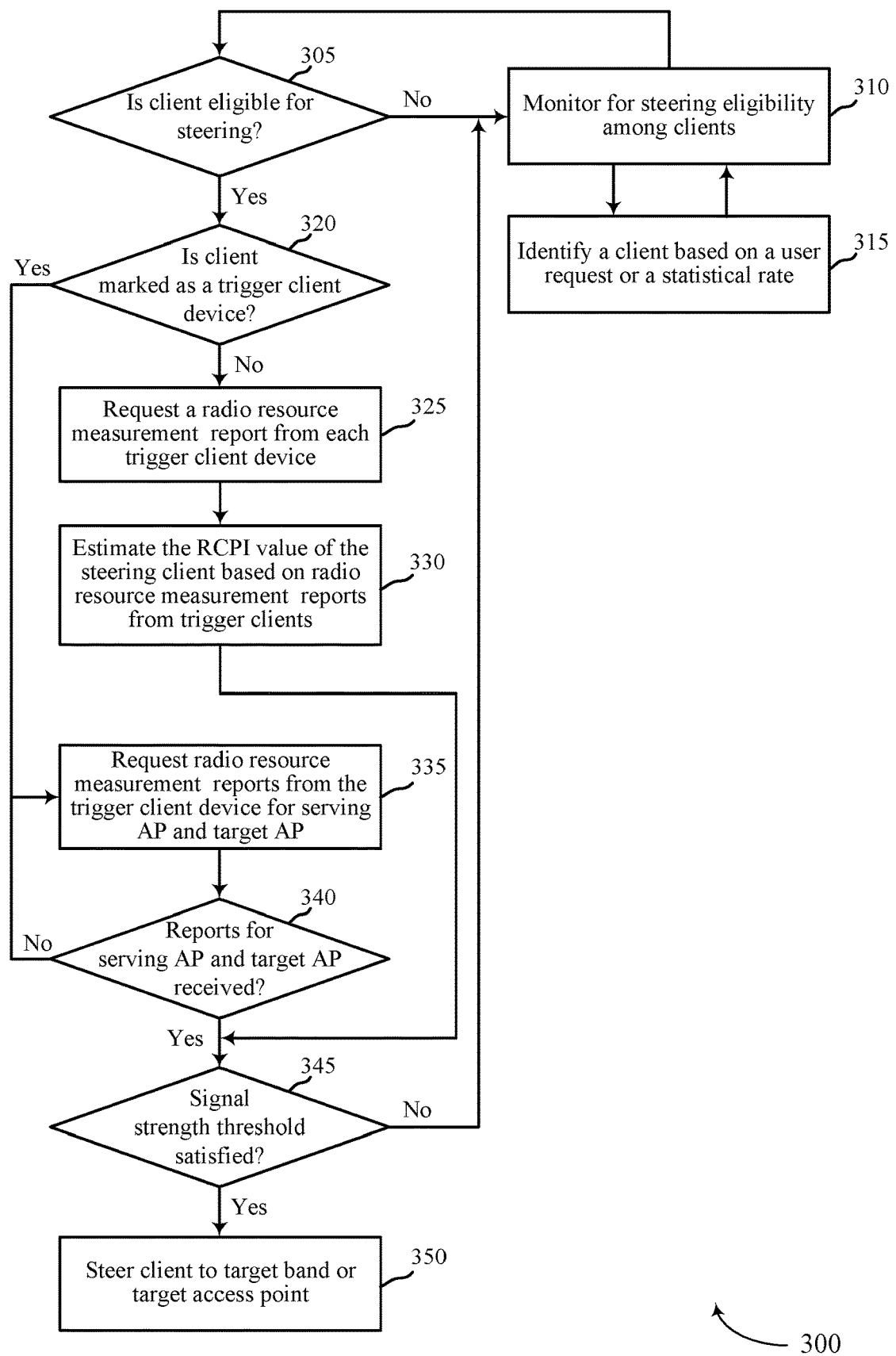
FIG. 3 illustrates an example of a flowchart illustrating an exemplary method that supports trigger-client based client steering in mesh networks in accordance with aspects of the present disclosure.

FIG. 3 illustrates an example of a flowchart illustrating an exemplary method 300 that supports trigger-client based client steering in mesh networks in accordance with aspects of the present disclosure. In some examples, method 300 may implement aspects of WLAN 100.

The operations of method 300 may be implemented by an access point (e.g., an AP 105) or its components as described herein. The operations of method 300 may be implemented by a station (e.g., a STA 115) or its components as described herein. The operations of method 300 may be implemented by a wireless device (e.g., AP 105 or STA 115, or both). For example, the operations of method 300 may be performed by a network manager as described with reference to FIGS. 5 through 8. In some examples, an AP or a STA, or both, may execute a set of instructions to control the functional elements of the AP or STA, or both, to perform the functions described herein. Additionally or alternatively, the AP or STA, or both, may perform aspects of the functions described herein using special-purpose hardware.

At 305, a wireless device may determine whether a client device (e.g., a STA 115) is eligible for steering. When the wireless device determines that the client device is not eligible for steering, at 310, the wireless device may monitor (e.g., continue monitoring) for steering eligibility among client devices (e.g., one or more STAs 115).

At 315, the wireless device may identify a client device (e.g., identify a client device as steering eligible) based on a user request or a statistical rate. The statistical rate may include a steering success rate (e.g., a number of successful steers over a total number of steerings initiated), or a reporting success rate (e.g., a number of reports received over a total number of requests initiated), or a request rejection rate (e.g., a number of rejected requests over a total number of requests initiated), a time out rate (e.g., a number of timed out reports over total number of requests initiated), an invalid report rate (e.g., a number of invalid reports received over a total number of reports received), a response time (e.g., a time it takes a client device to respond to a request), or any combination thereof. When the wireless device identifies, at 305, the client device as steering eligible the wireless device may verify the steering eligibility.

At 320, when the wireless device determines, at 305, that the client device is eligible for steering the wireless device may determine whether the client device is marked or characterized as a trigger client device. In some cases, the wireless device (e.g., before the determination at 320) may characterize the client device as a trigger client device based on one or more parameters of the client device. In some cases, a user (e.g., before the determination at 320) may configure or characterize the client device as a trigger client device.

At 325, when the wireless device determines, at 320, that the client device is not a trigger client device, the wireless device may request a radio resource measurement (RRM) report from each trigger client device. In some cases, the wireless device may identify each trigger client device in a network (e.g., a network of the wireless device) and request a RRM report from each identified trigger client device.

At 330, the wireless device may estimate the RCPI value of the client device based on RRM reports that the wireless device receives from the trigger client devices.

At 345, the wireless device may determine whether a signal strength threshold is satisfied with respect to the estimated RCPI value of the client device. In some cases, the signal strength threshold may be based on a received signal strength indicator (RSSI) threshold. When the wireless device determines that the signal strength threshold is not satisfied, the wireless device may continue monitoring, at 310, for eligibility among client devices.

At 350, when the wireless device determines that the signal strength threshold is satisfied, the wireless device may steer the client device from a serving band to a target band, or from a serving access point to a target access point. In some cases, the serving band and the target band may be provided by the same access point. In some cases, the serving band may be provided by a serving access point and the target band may be provided by the target access point.

At 335, when the wireless device determines, at 320, that the client device is a trigger client device, the wireless device may request an RRM report from the client device. In some cases, the wireless device may request RRM reports from each trigger client device respective to a serving access point (e.g., AP 105-*a* or AP 105-*b*) and a target access point (e.g., AP 105-*b* or AP 105-*a*). In some examples, the wireless device may be the serving access point or the target access point.

At 340, the wireless device may determine whether reports for the serving access point or target access point, or both, are received from at least one trigger client device. When the wireless device determines that reports for the serving access point or target access point, or both, are not received from at least one trigger client device, the wireless device may again, at 335, request RRM reports from each trigger client device respective to the serving access point and the target access point.

At 345, when the wireless device, at 340, determines that reports for the serving access point or target access point, or both, are received from at least one trigger client device, the wireless device may determine whether a signal strength threshold is satisfied. When the wireless device determines that the signal strength threshold is not satisfied, the wireless device may continue monitoring, at 310, for eligibility among client devices.

At 350, when the wireless device determines that the signal strength threshold is satisfied, the wireless device may steer the client device from a serving band to a target band, or from a serving access point to a target access point.

Figure 4:
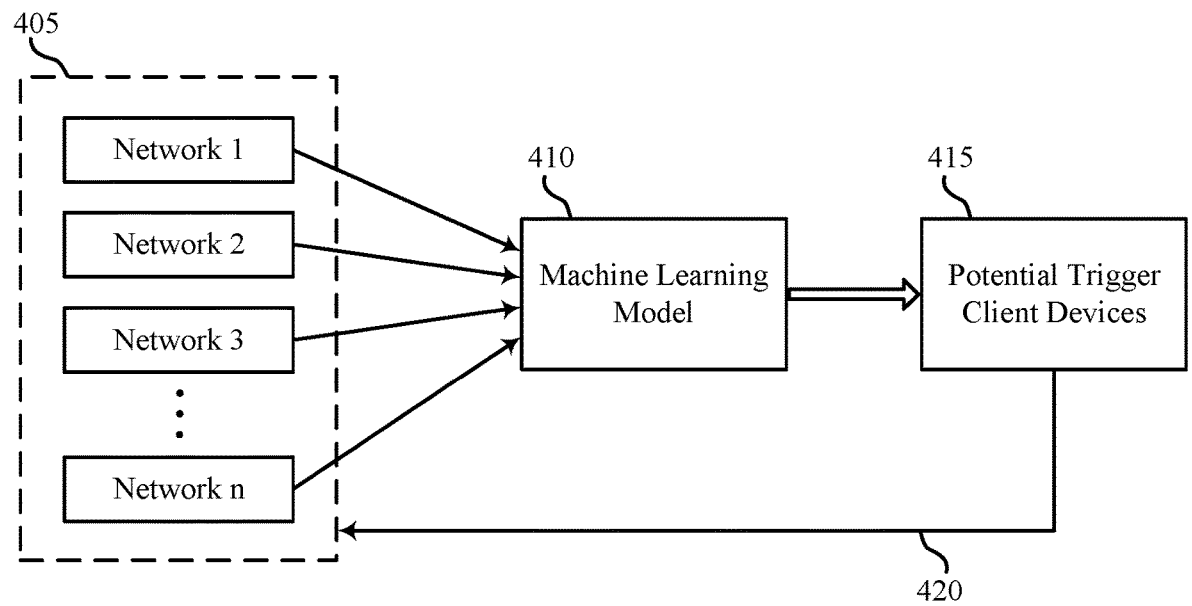
FIG. 4 illustrates an example of a block diagram of one example of an environment that supports trigger-client based client steering in mesh networks in accordance with various aspects of the present disclosure.

FIG. 4 illustrates an example of an environment 400 that supports trigger-client based client steering in mesh networks in accordance with aspects of the present disclosure. In some examples, environment 400 may implement aspects of WLAN 100.

In some examples, the operations of environment 400 may be implemented by an AP 105 or its components as described herein. In some examples, the operations of environment 400 may be implemented by a STA 115 or its components as described herein. The operations of environment 400 may be implemented by a wireless device (e.g., AP 105 or STA 115, or both). For example, the operations of environment 400 may be performed by a network manager as described with reference to FIGS. 5 through 8. In some examples, an AP or a STA, or both, may execute a set of instructions to control the functional elements of the AP or STA, or both, to perform the operations described herein. Additionally or alternatively, the AP or STA, or both, may perform aspects of the functions described herein using special-purpose hardware. In some examples, the operations of environment 400 may include identifying potential trigger client devices and selecting trigger client devices from the identified potential trigger client devices.

In the illustrated example, environment 400 may include a network set 405 that include n networks, where n is a positive integer. In some cases, a maximum number of networks in the network set 405 may be configured by a user. In some cases, the network set 405 may include one or more network sets, where at least a first network set includes a first number of networks up to a specified maximum number of networks and at least a second network set includes a second number of networks up to a specified maximum number of networks, where the second number of networks is less than, greater than, or equal to the first number of networks.

In the illustrated example, environment 400 may include a machine learning model 410. In some cases, the machine learning model 410 may include or may be based on a decision tree learning model, or a supervised learning model, or a clustering model, or an artificial neural network model, or a reinforcement learning model.

In some examples, a wireless device (e.g., AP 105 or STA 115, or both) may implement the machine learning model 410 to identify potential trigger client devices to assist the networks of network set 405 to select trigger client devices. In some cases, the wireless device may collect one or more parameters from the networks of the network set 405. Table 1 provides examples of the one or more parameters that may be collected and used to determine potential trigger client devices.

TABLE 1

| CATEGORY | SUB-CATEGORY | SCORE |
|---|---|---|
| User defined | User configured | 15 |
|  | Not configured | 0 |
| Successful 802.11k reports (No. of 802.11k reports received/Total no. of 802.11k requests initiated) | >90% | 3 |
|  | 70-90% | 2 |
|  | 50-70% | 1 |
|  | <50% | 0 |
| Steering success rate (No. of successful steers / Total no. of steerings initiated) | >90% | 3 |
|  | 70-90% | 2 |
|  | 50-70% | 1 |
|  | <50% | 0 |

TABLE 1-continued

| CATEGORY | SUB-CATEGORY | SCORE |
| --- | --- | --- |
| 802.11k Request rejected by client (No. of rejected 802.11k requests/ Total no. of 802.11k requests initiated) | >90% | −1 |
| | 70-90% | 0 |
| | 50-70% | 1 |
| | <50% | 2 |
| | Non-11k client | 0 |
| 802.11k Timed out - No report received for >5 secs (No. of timed out 802.11k reports/ Total no. of 11k requests initiated) | >90% | −1 |
| | 70-90% | 0 |
| | 50-70% | 1 |
| | <50% | 2 |
| | Non-11k client | 0 |
| 802.11k response time | <1 sec | 3 |
| | 1 sec-3 sec | 2 |
| | 3 sec-5sec | 1 |
| | Non-11k client | 0 |
| Invalid 802.11k report (No. of invalid 802.11k report received / Total no. of 802.11k report received) | >90% | −1 |
| | 70-90% | 0 |
| | 50-70% | 1 |
| | <50% | 2 |
| | Non-11k client | 0 |
| 802.11k Capability | Yes | 2 |
| | No | 0 |
| Radio Capability | 11ax | 3 |
| | 11ac | 2 |
| | 11n | 1 |
| | Others | 0 |
| Data rate at which client is being served | <10 Mbps | 4 |
| | 10-50 Mbps | 2 |
| | 50-100 Mbps | 0 |
| | >100 Mbps | −2 |

Table 1 provides examples of the one or more parameters in relation to an 802.11k wireless protocol. In some cases, the one or more parameters may be based on one or more wireless protocols, which may include the 802.11k wireless protocol. In some cases, a wireless device may characterize a client device as a trigger client device based on one or more parameters of the client device (e.g., based on at least one parameter of Table 1 provided by a network of network set 405). In some cases, a user may configure or characterize a client device as a trigger client device (e.g., user defined parameters).

In some examples, the one or more parameters may be categorized into one of two different sets of parameters. The two sets of parameters may include cloud parameters and network parameters. In some cases, the cloud parameters may include successful 11k reports, or steering success rate, or request rejected, or timed out reports, or response times, or invalid reports, or any combination thereof. In some cases, the network parameters may include one or more constant parameters that do not rely upon additional sampled data. In some cases, the network parameters may include user defined parameters (e.g., user defined trigger client devices), or wireless protocol capability, or radio capability (e.g., type of radios with which a client device is configured), or a serving data rate, or any combination thereof.

In the illustrated example, the machine learning model 410 may perform machine learning analysis on the one or more parameters provided to machine learning model 410 by the network set 405. In some cases, the machine learning model 410 may identify potential trigger client devices 415. In some cases, the machine learning model 410 may provide the identified potential trigger client devices 415 to the networks of the network set 405.

Based on machine learning model 410, the present techniques improve client steering in mesh networks by improving the selection of trigger client devices. The present techniques increase the accuracy of selecting trigger client device. For example, the analysis provided by machine learning model 410 improves selecting client devices that are determined, by machine learning model 410, to be best suited for trigger client device operations. The present techniques significantly reduce the time and overhead in selecting a client device as an appropriate trigger client device for a given network of the network set 405. The present techniques eliminate unnecessary delays in waiting for reports from clients that are highly unresponsive to such requests. The present techniques improve the steering efficiency and thus result in improved user experience. Based on the present techniques, any client device in a given network of the network set 405 may assist (e.g., assist an access point such as an AP 105) in steering any other client device in the respective network, thus forming an inter-dependent mesh network. The present techniques identify client devices with specified capabilities (e.g., wireless protocol compliant client devices, 802.11k compliant client devices, etc.) to be selected as trigger client devices because using these identified client devices as trigger client devices not only improves the efficiency of steering decisions for access points (e.g., an AP 105), but also improves the overall efficiency of the respective network. The present techniques make use of these specified capabilities in the identified client devices to assist the steering of other clients in the network that may not have the same specified capabilities, thus providing a better distributed and fairer network.

Figure 5:
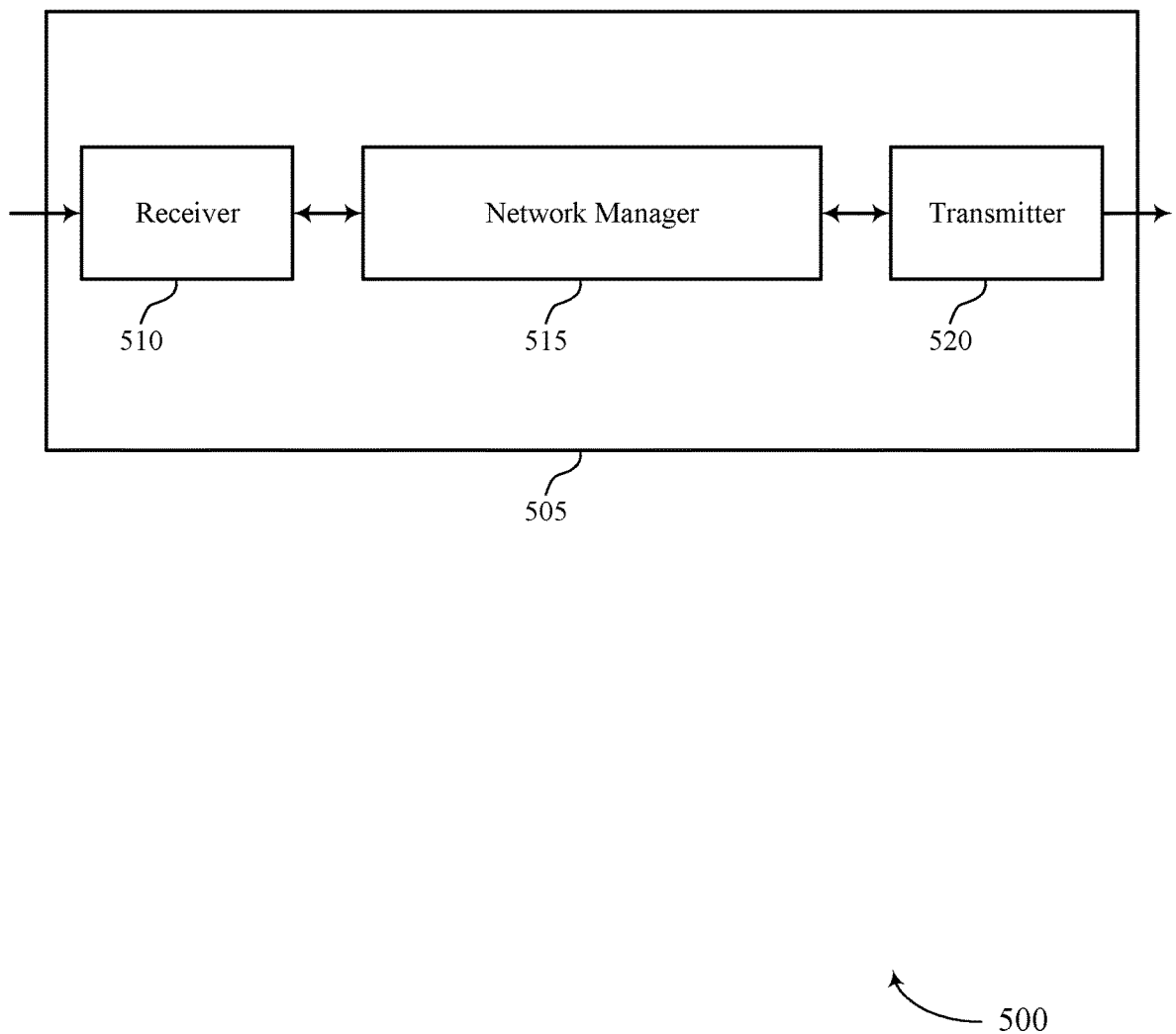
FIGS. 5 and 6 show block diagrams of devices that support trigger-client based client steering in mesh networks in accordance with aspects of the present disclosure.

FIG. 5 shows a block diagram 500 of a device 505 that supports trigger-client based client steering in mesh networks in accordance with aspects of the present disclosure. The device 505 may be an example of aspects of a device as described herein. The device 505 may include a receiver 510, a network manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to trigger-client based client steering in mesh networks, etc.). Information may be passed on to other components of the device 505. The receiver 510 may be an example of aspects of the transceiver 820 described with reference to FIG. 8. The receiver 510 may utilize a single antenna or a set of antennas.

The network manager 515 may determine that a client device within a range of the serving device is eligible for steering, where the client device is outside a set of one or more trigger client devices, request, based on the determination, a radio resource management report from at least one trigger client device of the set of one or more trigger client devices, receive the radio resource management report from the at least one trigger client device of the set of one or more trigger client devices, and perform a steering operation of the client device from the serving device to a target device based on the radio resource management report from the at least one trigger client device. The network manager 515 may be an example of aspects of the network manager 810 described herein.

The network manager 515, or its sub-components, may be implemented in hardware, code (e.g., software or firmware) executed by a processor, or any combination thereof. If implemented in code executed by a processor, the functions of the network manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The network manager 515, or its sub-components, may be physically located at various positions, including being distributed such that portions of functions are implemented at different physical locations by one or more physical components. In some examples, the network manager 515, or its sub-components, may be a separate and distinct component in accordance with various aspects of the present disclosure. In some examples, the network manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
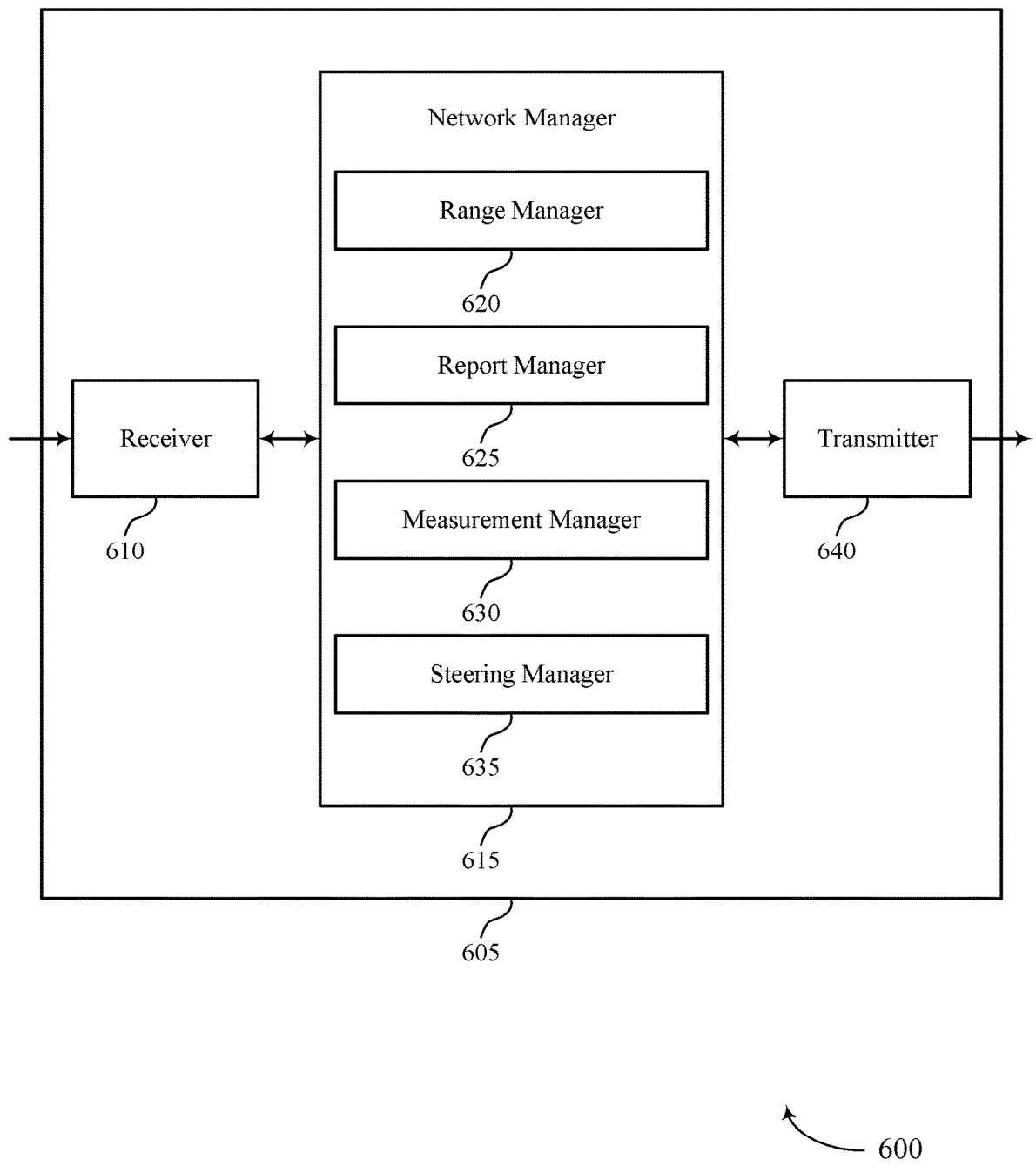

FIG. 6 shows a block diagram 600 of a device 605 that supports trigger-client based client steering in mesh networks in accordance with aspects of the present disclosure. The device 605 may be an example of aspects of a device 505 or a STA 115 as described herein. The device 605 may include a receiver 610, a network manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to trigger-client based client steering in mesh networks, etc.). Information may be passed on to other components of the device 605. The receiver 610 may be an example of aspects of the transceiver 820 described with reference to FIG. 8. The receiver 610 may utilize a single antenna or a set of antennas.

The network manager 615 may be an example of aspects of the network manager 515 as described herein. The network manager 615 may include a range manager 620, a report manager 625, a measurement manager 630, and a steering manager 635. The network manager 615 may be an example of aspects of the network manager 810 described herein.

The range manager 620 may determine that a client device within a range of the serving device is eligible for steering, where the client device is outside a set of one or more trigger client devices. The report manager 625 may request, based on the determination, a radio resource management report from at least one trigger client device of the set of one or more trigger client devices.

The measurement manager 630 may receive the radio resource management report from the at least one trigger client device of the set of one or more trigger client devices. The steering manager 635 may perform a steering operation of the client device from the serving device to a target device based on the radio resource management report from the at least one trigger client device.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
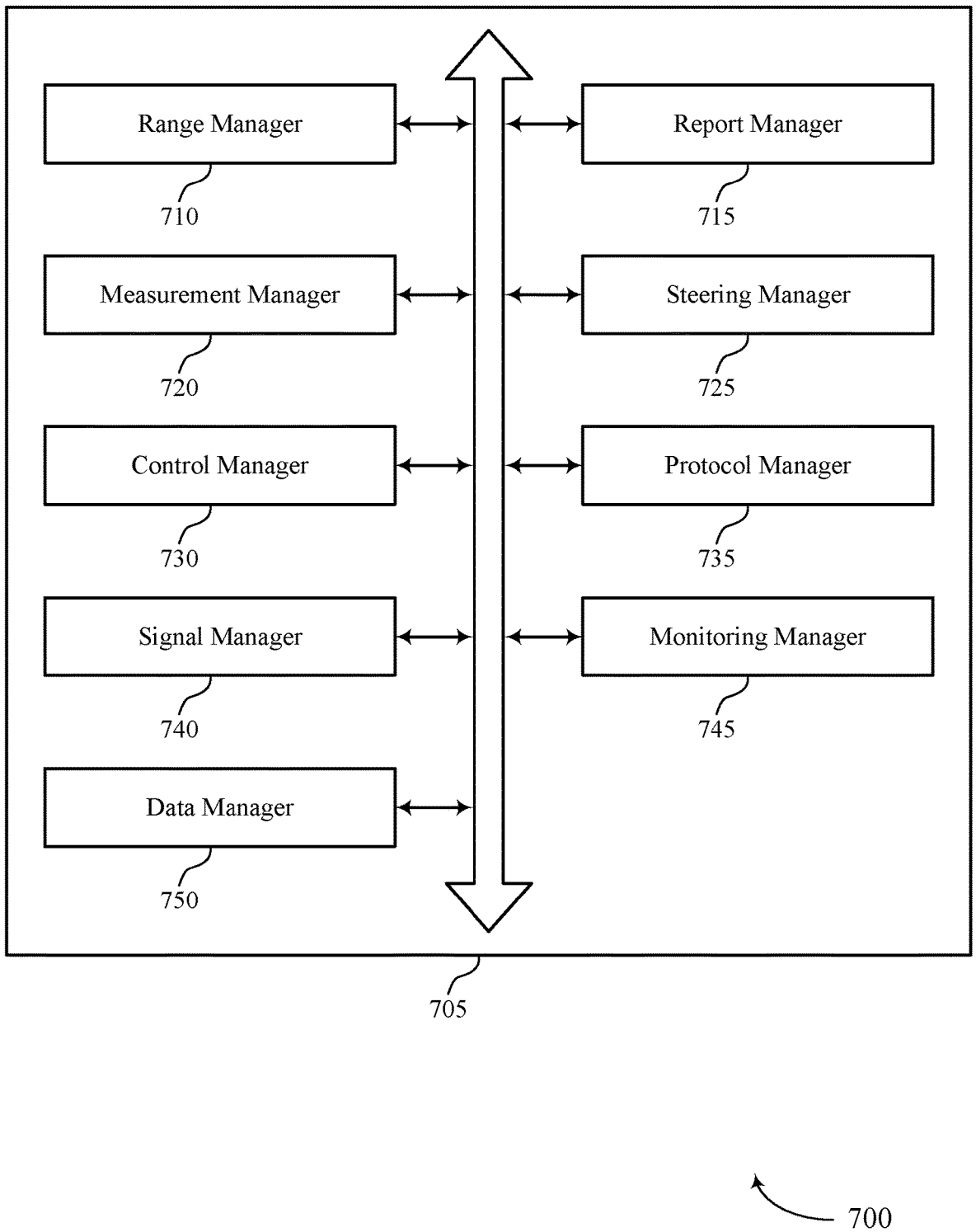
FIG. 7 shows a block diagram of a network manager that supports trigger-client based client steering in mesh networks in accordance with aspects of the present disclosure.

FIG. 7 shows a block diagram 700 of a network manager 705 that supports trigger-client based client steering in mesh networks in accordance with aspects of the present disclosure. The network manager 705 may be an example of aspects of a network manager 515, a network manager 615, or a network manager 810 described herein. The network manager 705 may include a range manager 710, a report manager 715, a measurement manager 720, a steering manager 725, a control manager 730, a protocol manager 735, a signal manager 740, a monitoring manager 745, and a data manager 750. Each of these modules may communicate, directly or indirectly, with one another (e.g., via one or more buses).

The range manager 710 may determine that a client device within a range of the serving device is eligible for steering, where the client device is outside a set of one or more trigger client devices. The report manager 715 may request, based on the determination, a radio resource management report from at least one trigger client device of the set of one or more trigger client devices. In some cases, the serving device is a serving access point and the target device is a target access point. In some cases, the wireless protocol includes an 802.11k wireless protocol. In some cases, at least one aspect of the radio resource management report is based on the 802.11k wireless protocol.

The measurement manager 720 may receive the radio resource management report from the at least one trigger client device of the set of one or more trigger client devices. The steering manager 725 may perform a steering operation of the client device from the serving device to a target device based on the radio resource management report from the at least one trigger client device.

The control manager 730 may compare a received channel power indicator of the serving device indicated in the radio resource management report to a received channel power indicator of the target device indicated in the radio resource management report. In some examples, the control manager 730 may determine the received channel power indicator of the target device exceeds the received channel power indicator of the serving device.

The protocol manager 735 may determine that the client device complies with a wireless protocol. In some examples, the protocol manager 735 may request, from the client device, a second radio resource management report based on determining that the client device complies with the wireless protocol.

In some examples, the protocol manager 735 may receive the radio resource management report from the client device. In some examples, the protocol manager 735 may steer the client device from a network of the serving device to a network of the target device based on the radio resource management report from the client device.

In some examples, the protocol manager 735 may designate, based on receiving the radio resource management report from the client device, a higher steering priority on the client device than on one or more other client devices in the network of the serving device. In some examples, the protocol manager 735 may determine the requested radio resource management report is not received from the client device.

In some examples, the protocol manager 735 may estimate a received channel power indicator for the client device based on the received channel power indicator of the serving device or the received channel power indicator of the target device, or both, indicated in the radio resource management report of the at least one trigger client device. The signal manager 740 may determine a received signal strength indicator of the client device satisfies a signal strength threshold.

The monitoring manager 745 may determine a second client device is not eligible for steering. In some examples, the monitoring manager 745 may monitor the second client device for steering eligibility. In some examples, the monitoring manager 745 may identify a trigger client device based on the monitoring and a user request or historical steering success rates, or both.

The data manager 750 may pass one or more parameters of a network of the serving device or one or more parameters of a network of the target device, or both, through a decision tree model. In some examples, the data manager 750 may identify, based on an output of the decision tree model, a trigger client device of the network of the serving device or the network of the target device.

Figure 8:
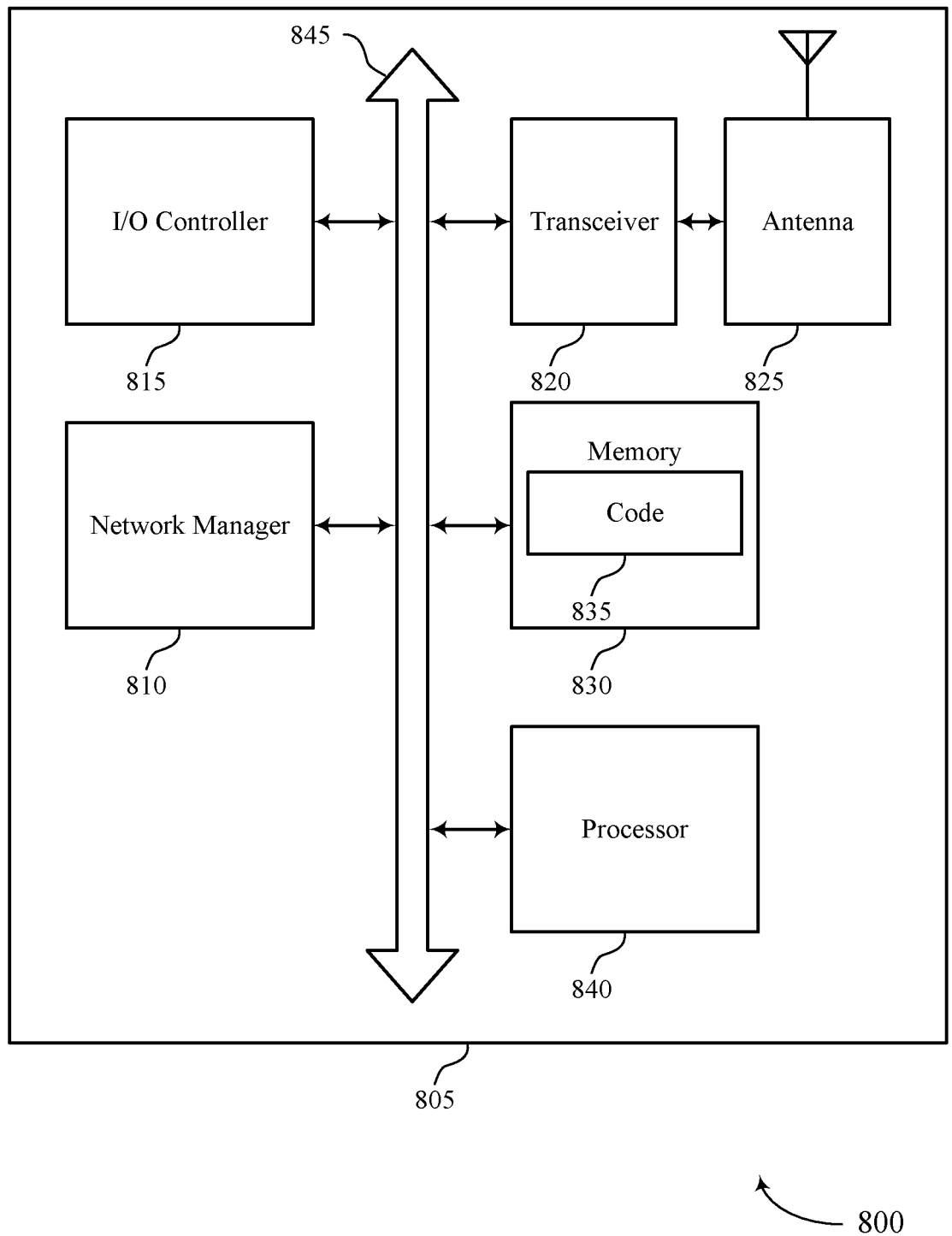
FIG. 8 shows a diagram of a system including a device that supports trigger-client based client steering in mesh networks in accordance with aspects of the present disclosure.

FIG. 8 shows a diagram of a system 800 including a device 805 that supports trigger-client based client steering in mesh networks in accordance with aspects of the present disclosure. The device 805 may be an example of or include the components of device 505, device 605, or a device as described herein. The device 805 may include components for bi-directional voice and data communications including components for transmitting and receiving communications, including a network manager 810, an I/O controller 815, a transceiver 820, an antenna 825, memory 830, a processor 840, and a coding manager 850. These components may be in electronic communication via one or more buses (e.g., bus 845).

The network manager 810 may determine that a client device within a range of the serving device is eligible for steering, where the client device is outside a set of one or more trigger client devices, request, based on the determination, a radio resource management report from at least one trigger client device of the set of one or more trigger client devices, receive the radio resource management report from the at least one trigger client device of the set of one or more trigger client devices, and perform a steering operation of the client device from the serving device to a target device based on the radio resource management report from the at least one trigger client device.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting trigger-client based client steering in mesh networks).

The code 835 may include instructions to implement aspects of the present disclosure, including instructions to support steering in mesh networks by a serving device. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
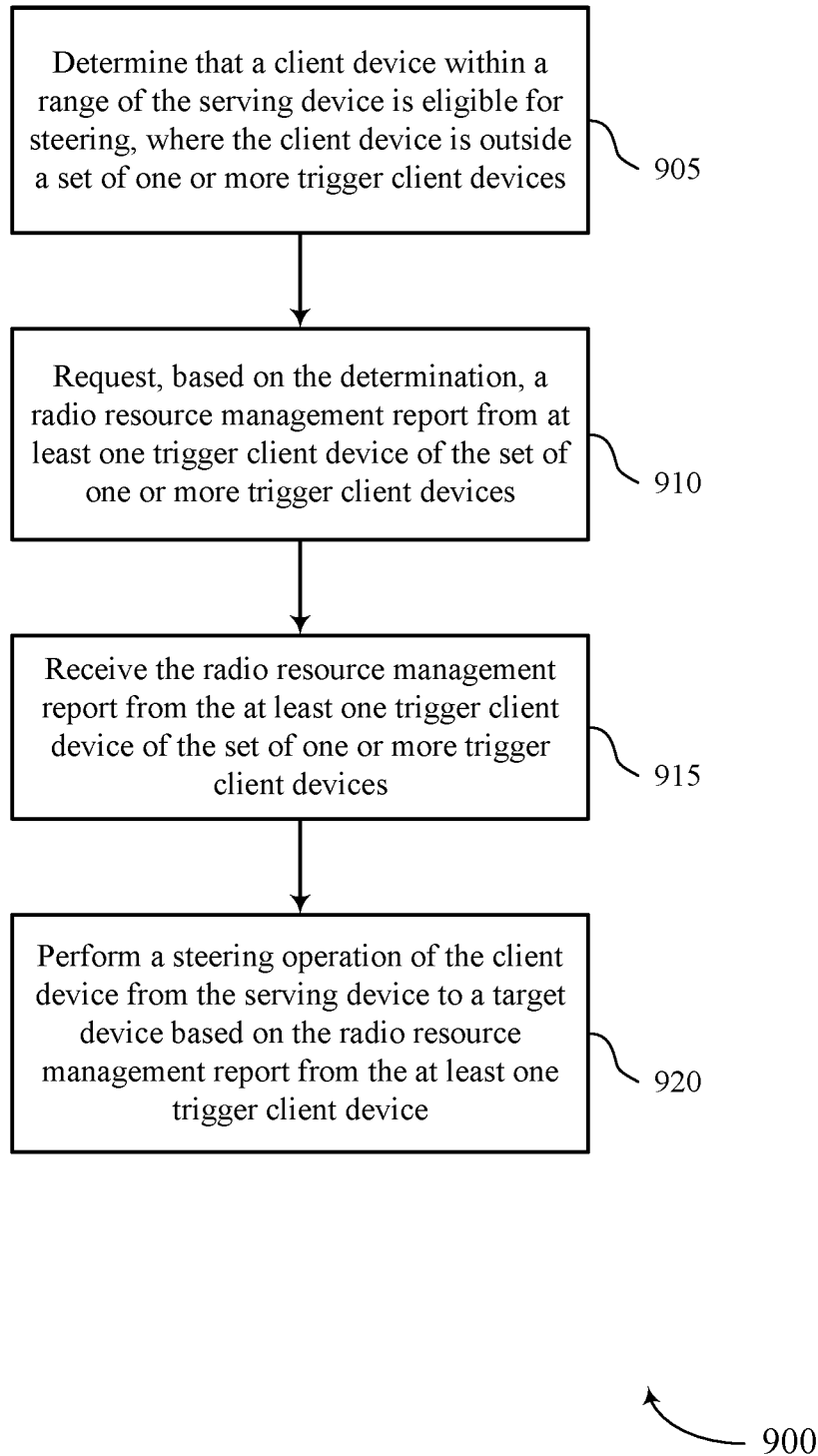
FIGS. 9 through 11 show flowcharts illustrating methods that support trigger-client based client steering in mesh networks in accordance with aspects of the present disclosure.

FIG. 9 shows a flowchart illustrating a method 900 that supports trigger-client based client steering in mesh networks in accordance with aspects of the present disclosure. The operations of method 900 may be implemented by a device or its components as described herein. For example, the operations of method 900 may be performed by a network manager as described with reference to FIGS. 5 through 8. In some examples, a device may execute a set of instructions to control the functional elements of the device to perform the functions described herein. Additionally, or alternatively, a device may perform aspects of the functions described herein using special-purpose hardware.

At 905, the device may determine that a client device within a range of the serving device is eligible for steering, where the client device is outside a set of one or more trigger client devices. The operations of 905 may be performed according to the methods described herein. In some examples, aspects of the operations of 905 may be performed by a range manager as described with reference to FIGS. 5 through 8.

At 910, the device may request, based on the determination, a radio resource management report from at least one trigger client device of the set of one or more trigger client devices. The operations of 910 may be performed according to the methods described herein. In some examples, aspects of the operations of 910 may be performed by a report manager as described with reference to FIGS. 5 through 8.

At 915, the device may receive the radio resource management report from the at least one trigger client device of the set of one or more trigger client devices. The operations of 915 may be performed according to the methods described herein. In some examples, aspects of the operations of 915 may be performed by a measurement manager as described with reference to FIGS. 5 through 8.

At 920, the device may perform a steering operation of the client device from the serving device to a target device based on the radio resource management report from the at least one trigger client device. The operations of 920 may be performed according to the methods described herein. In some examples, aspects of the operations of 920 may be performed by a steering manager as described with reference to FIGS. 5 through 8.

Figure 10:
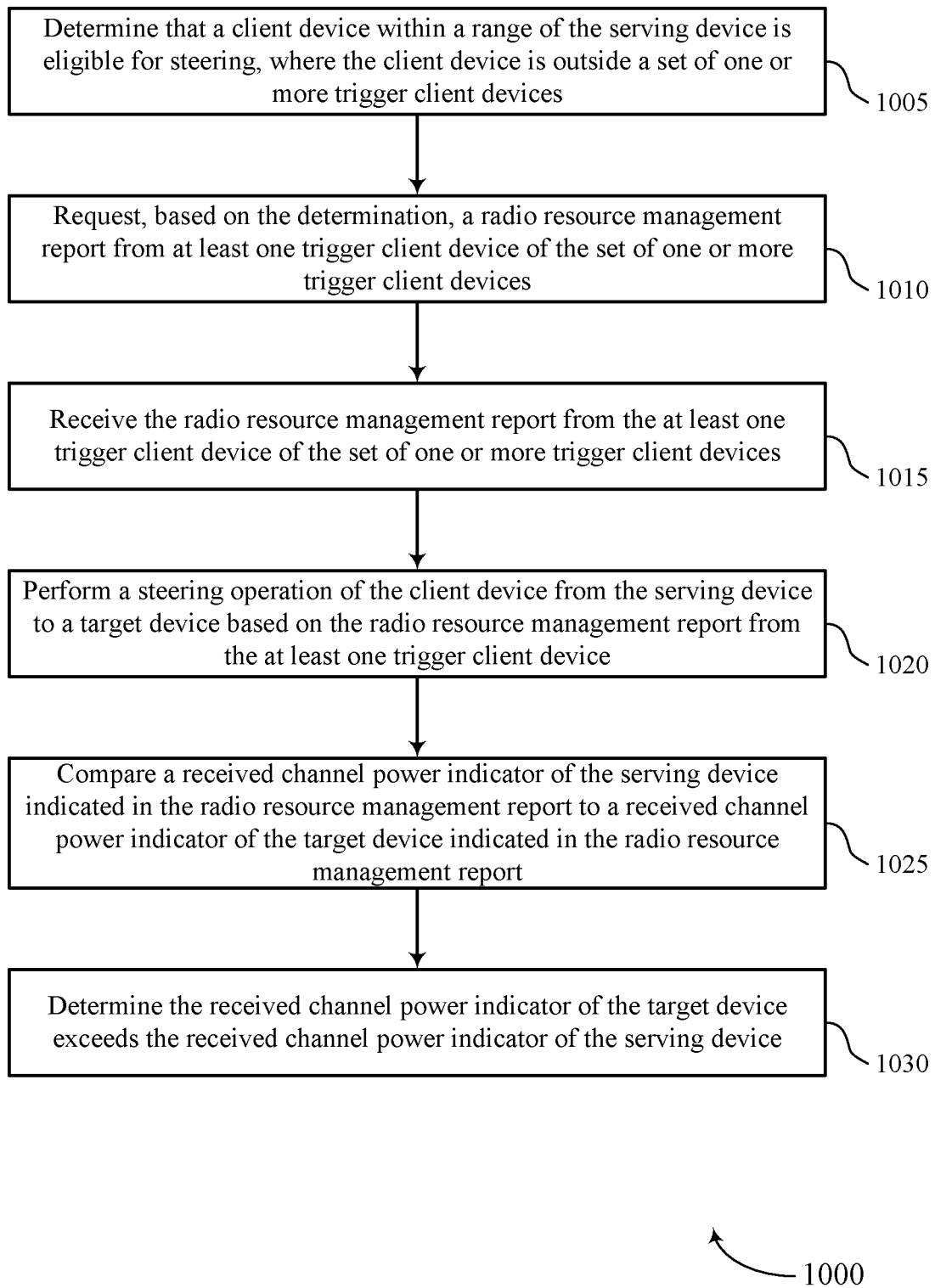

FIG. 10 shows a flowchart illustrating a method 1000 that supports trigger-client based client steering in mesh networks in accordance with aspects of the present disclosure. The operations of method 1000 may be implemented by a device or its components as described herein. For example, the operations of method 1000 may be performed by a network manager as described with reference to FIGS. 5 through 8. In some examples, a device may execute a set of instructions to control the functional elements of the device to perform the functions described herein. Additionally, or alternatively, a device may perform aspects of the functions described herein using special-purpose hardware.

At 1005, the device may determine that a client device within a range of the serving device is eligible for steering, where the client device is outside a set of one or more trigger client devices. The operations of 1005 may be performed according to the methods described herein. In some examples, aspects of the operations of 1005 may be performed by a range manager as described with reference to FIGS. 5 through 8.

At 1010, the device may request, based on the determination, a radio resource management report from at least one trigger client device of the set of one or more trigger client devices. The operations of 1010 may be performed according to the methods described herein. In some examples, aspects of the operations of 1010 may be performed by a report manager as described with reference to FIGS. 5 through 8.

At 1015, the device may receive the radio resource management report from the at least one trigger client device of the set of one or more trigger client devices. The operations of 1015 may be performed according to the methods described herein. In some examples, aspects of the operations of 1015 may be performed by a measurement manager as described with reference to FIGS. 5 through 8.

At 1020, the device may compare a received channel power indicator of the serving device indicated in the radio resource management report to a received channel power indicator of the target device indicated in the radio resource management report. The operations of 1020 may be performed according to the methods described herein. In some examples, aspects of the operations of 1020 may be performed by a control manager as described with reference to FIGS. 5 through 8.

At 1025, the device may determine the received channel power indicator of the target device exceeds the received channel power indicator of the serving device. The operations of 1025 may be performed according to the methods described herein. In some examples, aspects of the operations of 1025 may be performed by a control manager as described with reference to FIGS. 5 through 8.

At 1030, the device may perform a steering operation of the client device from the serving device to a target device based on the radio resource management report from the at least one trigger client device. The operations of 1030 may be performed according to the methods described herein. In some examples, aspects of the operations of 1030 may be performed by a steering manager as described with reference to FIG. 5 through.

Figure 11:
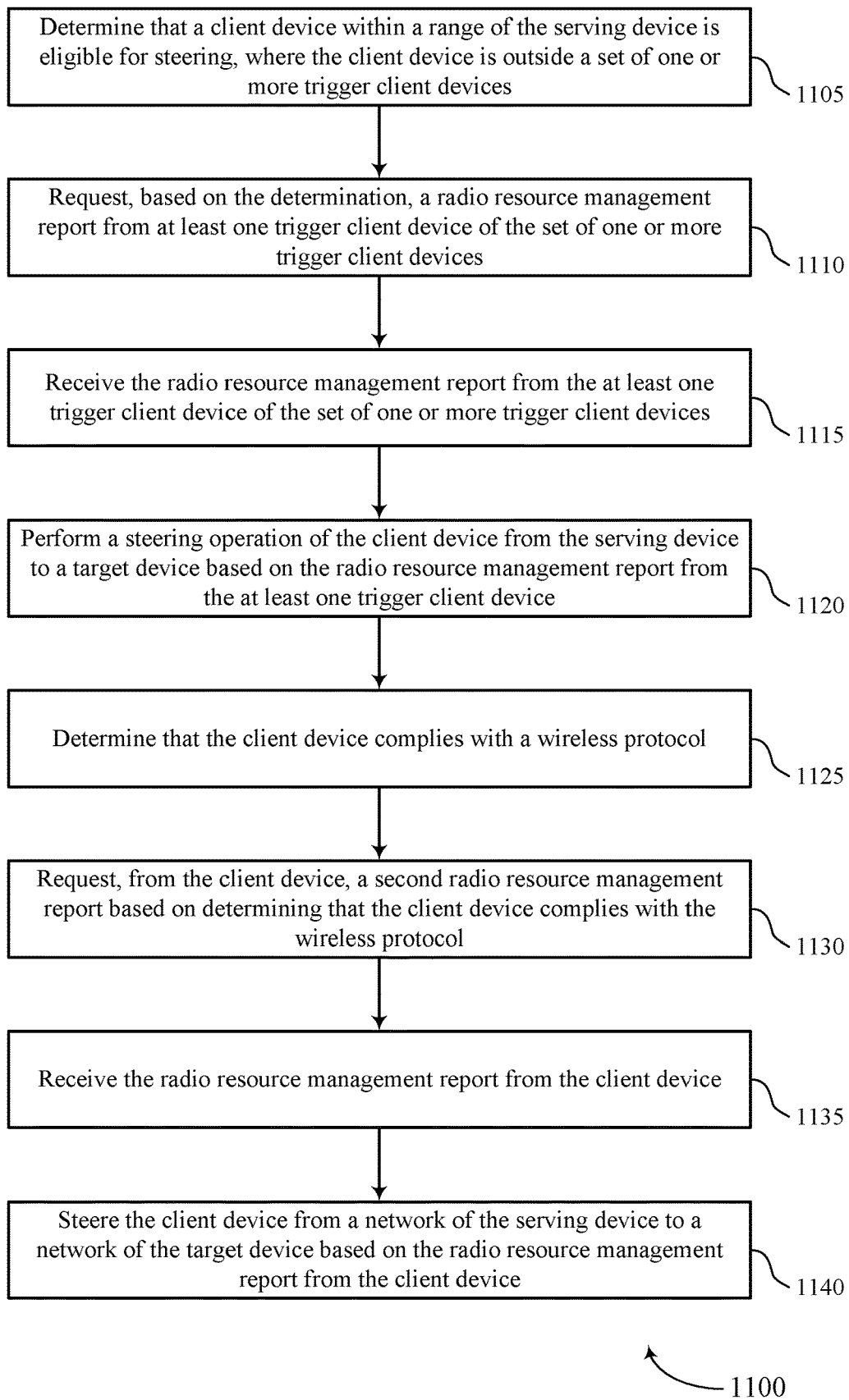

FIG. 11 shows a flowchart illustrating a method 1100 that supports trigger-client based client steering in mesh networks in accordance with aspects of the present disclosure. The operations of method 1100 may be implemented by a device or its components as described herein. For example, the operations of method 1100 may be performed by a network manager as described with reference to FIGS. 5 through 8. In some examples, a device may execute a set of instructions to control the functional elements of the device to perform the functions described herein. Additionally, or alternatively, a device may perform aspects of the functions described herein using special-purpose hardware.

At 1105, the device may determine that a client device within a range of the serving device is eligible for steering, where the client device is outside a set of one or more trigger client devices. The operations of 1105 may be performed according to the methods described herein. In some examples, aspects of the operations of 1105 may be performed by a range manager as described with reference to FIGS. 5 through 8.

At 1110, the device may request, based on the determination, a radio resource management report from at least one trigger client device of the set of one or more trigger client devices. The operations of 1110 may be performed according to the methods described herein. In some examples, aspects of the operations of 1110 may be performed by a report manager as described with reference to FIGS. 5 through 8.

At 1115, the device may receive the radio resource management report from the at least one trigger client device of the set of one or more trigger client devices. The operations of 1115 may be performed according to the methods described herein. In some examples, aspects of the operations of 1115 may be performed by a measurement manager as described with reference to FIGS. 5 through 8.

At 1120, the device may determine that the client device complies with a wireless protocol. The operations of 1120 may be performed according to the methods described herein. In some examples, aspects of the operations of 1120 may be performed by a protocol manager as described with reference to FIGS. 5 through 8.

At 1125, the device may request, from the client device, a second radio resource management report based on determining that the client device complies with the wireless protocol. The operations of 1125 may be performed according to the methods described herein. In some examples, aspects of the operations of 1125 may be performed by a protocol manager as described with reference to FIGS. 5 through 8.

At 1130, the device may receive the radio resource management report from the client device. The operations of 1130 may be performed according to the methods described herein. In some examples, aspects of the operations of 1130 may be performed by a protocol manager as described with reference to FIGS. 5 through 8.

At 1135, the device may steer the client device from a network of the serving device to a network of the target device based on the radio resource management report from the client device. The operations of 1135 may be performed according to the methods described herein. In some examples, aspects of the operations of 1135 may be performed by a protocol manager as described with reference to FIGS. 5 through 8.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and the environment 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for steering in mesh networks by a serving device, the method comprising:
    determining that a client device within a range of the serving device is eligible for steering, wherein the client device is outside a set of one or more trigger client devices;
    requesting, based at least in part on the determination, a radio resource management report from at least one trigger client device of the set of one or more trigger client devices;
    receiving the radio resource management report from the at least one trigger client device of the set of one or more trigger client devices; and
    performing a steering operation of the client device from the serving device to a target device based at least in part on the radio resource management report from the at least one trigger client device, wherein a received channel power indicator of the target device indicated in the radio resource management report exceeds a received channel power indicator of the serving device.

2. The method of claim 1, comprising:
    determining that the client device complies with a wireless protocol; and
    requesting, from the client device, a second radio resource management report based at least in part on determining that the client device complies with the wireless protocol.

3. The method of claim 2, comprising:
    receiving the second radio resource management report from the client device; and
    steering the client device from a network of the serving device to a network of the target device based at least in part on the radio resource management report from the client device.

4. The method of claim 3, comprising:
    designating, based at least in part on receiving the second radio resource management report from the client device, a higher steering priority on the client device than on one or more other client devices in the network of the serving device.

5. The method of claim 2, comprising:
    determining the requested second radio resource management report is not received from the client device; and
    estimating a received channel power indicator for the client device based at least in part on the received channel power indicator of the serving device or the received channel power indicator of the target device, or both, indicated in the radio resource management report of the at least one trigger client device.

6. The method of claim 2, wherein the wireless protocol comprises an 802.11k wireless protocol.

7. The method of claim 6, wherein at least one aspect of the radio resource management report, at least one aspect of the second radio resource management report, or both, is based at least in part on the 802.11k wireless protocol.

8. The method of claim 1, wherein determining the client device is eligible for steering comprises:
    determining a received signal strength indicator of the client device satisfies a signal strength threshold.

9. The method of claim 1, comprising:
    determining a second client device is not eligible for steering;
    monitoring the second client device for steering eligibility; and
    identifying a trigger client device based at least in part on the monitoring and a user request or historical steering success rates, or both.

10. The method of claim 1, comprising:
    passing one or more parameters of a network of the serving device or one or more parameters of a network of the target device, or both, through a decision tree model; and
    identifying, based at least in part on an output of the decision tree model, a trigger client device of the network of the serving device or the network of the target device.

11. The method of claim 1, wherein the serving device is a serving access point and the target device is a target access point.

12. An apparatus for steering in mesh networks by a serving device, the apparatus comprising:
    a processor,
    memory coupled with the processor; and
    instructions stored in the memory and executable by the processor to cause the apparatus to:
        determine that a client device within a range of the serving device is eligible for steering, wherein the client device is outside a set of one or more trigger client devices;
        request, based at least in part on the determination, a radio resource management report from at least one trigger client device of the set of one or more trigger client devices;
        receive the radio resource management report from the at least one trigger client device of the set of one or more trigger client devices; and
        perform a steering operation of the client device from the serving device to a target device based at least in part on the radio resource management report from the at least one trigger client device, wherein a received channel power indicator of the target device indicated in the radio resource management report exceeds a received channel power indicator of the serving device.

13. The apparatus of claim 12, wherein the instructions are further executable by the processor to cause the apparatus to:

determine that the client device complies with a wireless protocol; and request, from the client device, a second radio resource management report based at least in part on determining that the client device complies with the wireless protocol.

14. The apparatus of claim 13, wherein the instructions are further executable by the processor to cause the apparatus to:

receive the second radio resource management report from the client device; and steer the client device from a network of the serving device to a network of the target device based at least in part on the radio resource management report from the client device.

15. The apparatus of claim 14, wherein the instructions are further executable by the processor to cause the apparatus to:

designate, based at least in part on receiving the second radio resource management report from the client device, a higher steering priority on the client device than on one or more other client devices in the network of the serving device.

16. The apparatus of claim 13, wherein the instructions are further executable by the processor to cause the apparatus to:

determine the requested second radio resource management report is not received from the client device; and estimate a received channel power indicator for the client device based at least in part on the received channel power indicator of the serving device or the received channel power indicator of the target device, or both, indicated in the radio resource management report of the at least one trigger client device.

17. The apparatus of claim 13, wherein the wireless protocol comprises an 802.11k wireless protocol.

18. An apparatus for steering in mesh networks by a serving device, the apparatus comprising:

means for determining that a client device within a range of the serving device is eligible for steering, wherein the client device is outside a set of one or more trigger client devices;

means for requesting, based at least in part on the determination, a radio resource management report from at least one trigger client device of the set of one or more trigger client devices;

means for receiving the radio resource management report from the at least one trigger client device of the set of one or more trigger client devices; and means for performing a steering operation of the client device from the serving device to a target device based at least in part on the radio resource management report from the at least one trigger client device, wherein a received channel power indicator of the target device exceeds a received channel power indicator of the serving device.

* * * * *